United States Patent
Cho et al.

(10) Patent No.: US 10,848,300 B2
(45) Date of Patent: Nov. 24, 2020

(54) METHOD AND APPARATUS FOR DETECTING SYNCHRONIZATION SIGNAL

(71) Applicant: Samsung Electronics Co., Ltd., Suwon-si (KR)

(72) Inventors: Sung-Yoon Cho, Seoul (KR); Joo-Hyun Do, Seoul (KR); Hae-Chul Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 206 days.

(21) Appl. No.: 15/622,689

(22) Filed: Jun. 14, 2017

(65) Prior Publication Data

US 2018/0083766 A1 Mar. 22, 2018

(30) Foreign Application Priority Data

Sep. 20, 2016 (KR) .................. 10-2016-0120056

(51) Int. Cl.
| | |
|---|---|
| H04L 7/04 | (2006.01) |
| H04J 11/00 | (2006.01) |
| H04J 13/00 | (2011.01) |
| H04L 7/00 | (2006.01) |

(52) U.S. Cl.
CPC .......... *H04L 7/042* (2013.01); *H04J 11/0069* (2013.01); *H04J 13/0062* (2013.01); *H04L 7/0087* (2013.01); *H04J 2013/0096* (2013.01)

(58) Field of Classification Search
None
See application file for complete search history.

(56) References Cited

U.S. PATENT DOCUMENTS

| | | | |
|---|---|---|---|
| 8,179,810 B2 | 5/2012 | Onggosanusi et al. | |
| 2003/0161543 A1* | 8/2003 | Tanaka | G01S 7/4802 |
| | | | 382/250 |
| 2006/0088116 A1* | 4/2006 | Chen | H04L 5/0048 |
| | | | 375/260 |
| 2010/0317358 A1* | 12/2010 | Sawamoto | H04B 1/7073 |
| | | | 455/450 |

(Continued)

OTHER PUBLICATIONS

"Jameson, Iain", "Time Delay Estimation", 2006, "Australian Government Department of Defence Defence Science and Technology Organisation", DSTO-TR-1705, pp. 1-37 (Year: 2006).*

*Primary Examiner* — Noel R Beharry
*Assistant Examiner* — Rodrick Mak
(74) *Attorney, Agent, or Firm* — Harness, Dickey & Pierce, P.L.C.

(57) ABSTRACT

A chip for detecting a synchronization signal generated based on one of a plurality of sequences, which is generated by a sequence generator, the chip including a memory, and a processor connected to the memory may be provided. The processor may be configured to receive the synchronization signal, perform first descrambling the received synchronization signal for a first sequence from among the plurality of sequences by multiplying the received synchronization signal by the first sequence, and perform second descrambling the received synchronization signal for a second sequence, which is a complex conjugate of the first sequence, from among the plurality of sequences of the received synchronization signal by changing a sign of at least one element of a descrambled sequence of the first sequence.

17 Claims, 7 Drawing Sheets

(56) References Cited

U.S. PATENT DOCUMENTS

| | | | |
|---|---|---|---|
| 2011/0007704 A1* | 1/2011 | Swarts | H04J 11/0073 |
| | | | 370/330 |
| 2011/0206127 A1* | 8/2011 | Nguyen | H04N 5/145 |
| | | | 375/240.16 |
| 2014/0341378 A1* | 11/2014 | Kandekar | H04L 25/03866 |
| | | | 380/255 |
| 2016/0242131 A1* | 8/2016 | Popovic | H04B 1/7073 |
| 2016/0277176 A1* | 9/2016 | Zhou | H04B 1/7083 |
| 2017/0094623 A1* | 3/2017 | Raza | H04L 1/0058 |
| 2017/0223650 A1* | 8/2017 | Ko | H04L 27/2601 |
| 2018/0332491 A1* | 11/2018 | Eckardt | H04L 5/0051 |

* cited by examiner

METHOD AND APPARATUS FOR DETECTING SYNCHRONIZATION SIGNAL

CROSS-REFERENCE TO RELATED APPLICATION(S)

This application claims priority under 35 U.S.C. § 119(a) to a Korean Patent Application No. 10-2016-0120056, filed on Sep. 20, 2016, in the Korean Intellectual Property Office, the entire disclosure of which is incorporated herein by reference.

TECHNICAL FIELD

The present disclosure relates to methods and/or apparatuses for detecting a synchronization signal.

BACKGROUND

In a wireless communication system, a synchronization signal is used to detect or synchronize devices. A synchronization signal transmitted by one device may be detected by another device, and another device having received the synchronization signal can identify the one device having transmitted the synchronization signal. In a mobile communication system such as Long Term Evolution (LTE), a base station may broadcast a synchronization signal for synchronization with user equipment (UEs). Further, the UEs may also transmit a synchronization signal for direct communication to other UEs.

Several communication standards, such as LTE-based narrow band Internet of Things (NB-IoT), may use a synchronization signal in which a Zadoff Chu (ZC) sequence, a Hadamard matrix, and a cyclic shift are combined. In this case, to detect a synchronization signal, a received synchronization signal may be desired to be descrambled by using all possible synchronization signals which are deduced from a product of the total number of sequences that may be generated by ZC used for generation of the synchronization signals (e.g., the number of rows used in the Hadamard matrix, and the numbers of cases of cyclic shift). However, detection of the synchronization signal using the number of all possible cases may take a relatively long processing time, and may be inefficient in terms of energy.

The above information is presented as background information only to assist with an understanding of the present disclosure. No determination has been made, and no assertion is made, as to whether any of the above might be applicable as prior art with regard to the present disclosure.

SUMMARY

Accordingly, the present disclosure provides methods and/or apparatuses for detecting a synchronization signal, which reduces a processing time.

The present disclosure provides methods and/or apparatuses for detecting a synchronization signal, which reduces power consumption.

The present disclosure is not limited to the aforementioned methods and/or apparatuses, and other methods and/or apparatuses that are not mentioned may be clearly understood from the following disclosure by those of ordinary skill in the art.

According to an aspect of the present disclosure, a chip for detecting a synchronization signal generated based on one of a plurality of sequences, which is generated by a sequence generator, may include a memory, and a processor connected to the memory. The processor may be configured to receive the synchronization signal, perform first descrambling the received synchronization signal for a first sequence from among the plurality of sequences by multiplying the received synchronization signal by the first sequence, and perform second descrambling the received synchronization signal for a second sequence, which is a complex conjugate of the first sequence, from among the plurality of sequences of the received synchronization signal by changing a sign of at least one element of a descrambled sequence of the first sequence.

According to another aspect of the present disclosure, a chip for detecting a synchronization signal generated based on one of a plurality of sequences, which is generated by a sequence generator and based on one of a plurality of phases, may include a memory, and a processor connected to the memory. The processor may be configured to receive the synchronization signal, perform descrambling with respect to each of the plurality of sequences of the received synchronization signal, apply inverse fast Fourier transform (IFFT) to a cumulative sum of results, the cumulative sum of results obtained by sequentially dividing a descrambled sequence of each of the plurality of sequences of the received synchronization signal in units of N samples, and detect a phase having the highest correlation with the received synchronization signal from among the plurality of phases based on a result of applying the IFFT.

According to another aspect of the present disclosure, a chip for detecting a synchronization signal generated based on one of a plurality of sequences, which is generated by a sequence generator, may include a memory, and a processor configured to communicate with the memory. The processor may be configured to receive the synchronization signal, group the plurality of sequences into a plurality of groups, generate a descrambled sequence for each of the plurality of groups, by descrambling the received synchronization signal for a reference signal, the reference signal generated based on a sum of sequences in each of the plurality of groups, detect a group having the highest correlation with the received synchronization signal from among the plurality of groups by performing inverse fast Fourier transform (IFFT) on the descrambled sequence for each of the plurality of groups, and detect a sequence having the highest correlation with the received synchronization signal from among sequences in the detected group, by descrambling the received synchronization signal using each of sequences in the detected group.

According to another aspect of the present disclosure, a chip for identifying a device transmitting a synchronization signal, which is generated based on one of a plurality of sequences, may include at least one antenna configured to receive an analog signal including the synchronization signal, a memory configured to store data and computer-readable instructions, and a processor configured to execute computer-readable instructions such that the processor are configured to sample the analog signal into a digital signal, filter out a portion of the digital signal, which has a frequency band different from that of the synchronization signal, from the digital signal to produce a filtered digital signal, perform descrambling the filtered digital signal with respect to a first sequence from among the plurality of sequences by multiplying the filtered digital signal by the first sequence, and perform descrambling the filtered digital signal with respect to a second sequence, which is a complex conjugate of the first sequence, from among the plurality of sequences of the filtered digital signal by changing a sign of at least one element of a descrambled sequence of the first sequence.

Some details of example embodiments are included in a detailed description and drawings.

Other aspects, advantages, and salient features of the disclosure will become apparent to those skilled in the art from the following detailed description, which, taken in conjunction with the annexed drawings, discloses some example embodiments of the disclosure.

BRIEF DESCRIPTION OF THE DRAWINGS

The above and other aspects, features and advantages of some example embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Advantages and features of the present disclosure and methods for achieving them will be apparent with reference to the example embodiments described below together with the attached drawings. However, the present disclosure is not limited to the disclosed example embodiments, but may be implemented in various manners, and the example embodiments are provided to complete the disclosure of the present disclosure and to allow those of ordinary skill in the art to understand the scope of the present disclosure. The present disclosure is defined by the category of the claims.

Although the ordinal terms such as "first", "second", etc., are used to describe various elements, these elements are not limited to these terms. These terms are used to merely distinguish one element from another element. Therefore, a first element mentioned below may be a second element within the technical spirit of the present disclosure.

Figure 1:
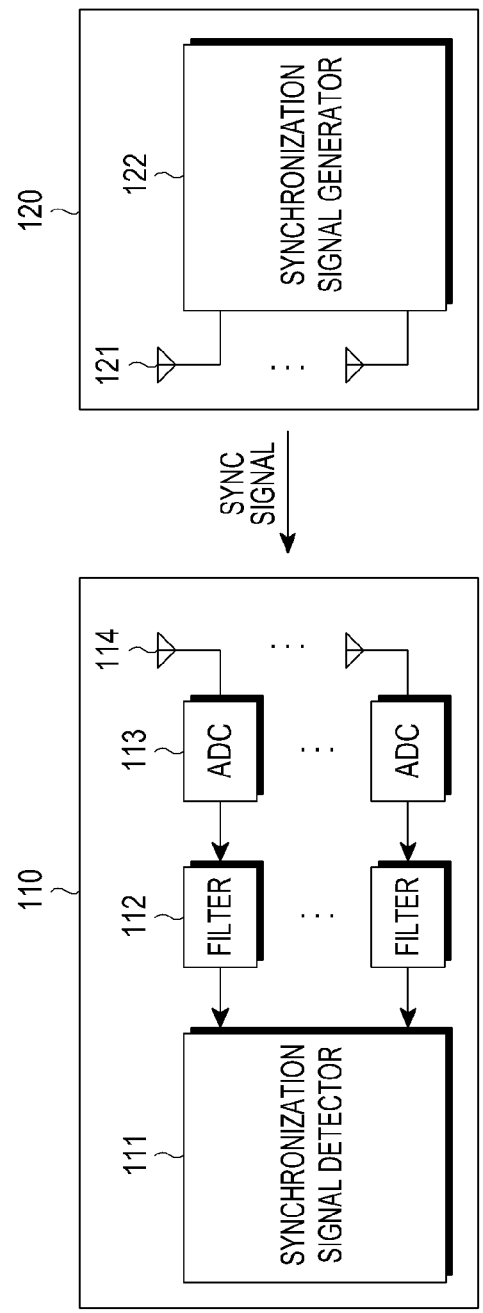
FIG. 1 illustrates a base station and a device according to an example embodiment of the present disclosure.

FIG. 1 illustrates a base station and a device according to an example embodiment of the present disclosure. Referring to FIG. 1, a base station 120 may include a synchronization signal generator 122 and an antenna 121.

The synchronization signal generator 122 may generate a synchronization signal. The synchronization signal generator 122 may generate a synchronization signal based on code conversion using a sequence generated by a sequence generator (not shown), which is configured to generate a plurality of sequences and a set of a plurality of binary codes, each of which sets a sign for each of members of the sequence, and/or based on phase conversion using one of a plurality of phases. According to some example embodiments, the synchronization signal may be generated using one of the code conversion or the phase conversion, or without using any of them.

According to several example embodiments, the sequence generator may be a ZC sequence generator, which is configured to generate a ZC sequence. Each of the plurality of binary codes may be selected between +1 and −1. According to some example embodiments, a binary code may be a sign for a row of a Hadamard matrix, and a set of a plurality of binary codes may be a set of signs for a set of rows of the Hadamard matrix.

According to some example embodiments, an NB-secondary synchronization signal (NSSS), which is an example of a synchronization signal, may be expressed as follows:

$$NSSS(n) = e^{\frac{j\pi r_p(n'(n'+1))}{N_{ZC}}} C_{S_p}(n) e^{\frac{j2\pi l_q n}{d_{max}}}, \quad (1)$$

$$n' = n \bmod N_{ZC}, n = \{0, 1, \ldots, N_{ZC}\},$$

$$l_0 = 0, l_1 = 33, l_2 = 66, l_3 = 99, d_{max} = 132$$

$$C_{S_p}(n) = Hadamard_{S_p}^{128 \times 128}(\bmod(n, 128)), p = 0, 1, 2, 3$$

where $$S_0 = 0, S_1 = 31, S_2 = 63, S_3 = 127.$$

In Equation 1, $$e^{\frac{j\pi r_p(n'(n'+1))}{N_{ZC}}}$$

is an equation for generating a ZC sequence. According to a value of a root index $r_p$, different ZC sequences may be generated. According to some example embodiments, a value of a root index may be determined by, but not limited to, $r_p$=mod(PCID,126)+3. A physical cell identifier (PCID) indicates an identifier of a cell that transmits a synchronization signal. According to the above equation, 126 $r_p$ values from 3 to 129 may exist, such that 126 ZC sequences may be generated. According to n, a value of each of members (e.g., symbols) in the ZC sequence may be generated. $N_{ZC}$ is a constant used to generate the ZC sequence, and generally, a decimal may be designated as a value of $N_{ZC}$.

In Equation 1, indicates the Hadamard matrix. Each row of the Hadamard matrix is a binary code having a value of +1 or −1, and the Hadamard matrix is a set of binary codes. According to p, a specific row may be selected from the Hadamard matrix. According to n, a value (e.g., +1 or −1) corresponding to a specific column in the row, which is selected based on p, may be selected, and the selected value may be used to determine a sign of a corresponding symbol in the ZC sequence. If a value of −1 is selected, the sign of the corresponding symbol in the ZC sequence may be inverted.

In Equation 1, indicates a cyclic shift. indicates a phase according to the index n of the symbol in the ZC sequence. A position on a time axis in which the synchronization signal is transmitted according to the cyclic shift may be expressed using phase conversion based on q. In the above example, four symbol positions on the time axis may be determined according to $1_q$, which is determined based on q of 0 through 3. However, example embodiments are not limited thereto. $1_q/d_{max}$ has a value of 0, ¼, ½, or ¾ according to q. A phase of each symbol in the ZC sequence may be configured to not be changed or be changed with a period of four symbols or two symbols.

Detection of a synchronization signal may mean detection of the ZC sequence (e.g., detection of the row of the Hadamard matrix and the cyclic shift, which are used to generate the synchronization signal). In Equation 1, a total of 2016 synchronization signals may be generated, which are deduced from a product of the number of ZC sequences, 126, the number of rows of the used Hadamard matrix, 4, and the number of cyclic shifts, 4. Detection of a synchronization signal by performing descrambling for a received synchronization signal using each of 2016 possible synchronization signals may be inefficient in terms of a processing time and/or power consumption.

The antenna 121 may transmit or broadcasts the synchronization signal generated by the synchronization signal generator 122. According to some example embodiments, the base station 120 may include the plurality of antennas 121 to support multiple input multiple output (MIMO) or beamforming, and may transmit a synchronization signal by using all of or each of the plurality of antennas 121.

The device 110 may be referred to as a UE, and may be a cellular phone, a smartphone, a personal digital assistant (PDA), a tablet computer, a laptop computer, an IoT device, or an arbitrary device that may communicate with the base station 120. The device 110 may include an antenna 114, an analog-to-digital converter (ADC) 113, a filter 112, and a synchronization signal detector 111.

The device 110 may receive a synchronization signal transmitted from the base station 120 via the antenna 114. According to some example embodiments, the base station 120 may include the plurality of antennas 121.

The ADC 113 may sample a signal including the received synchronization signal for conversion into a digital signal.

The filter 112 may remove from the received signal, or suppresses in the received signal, a signal in a frequency band other than a signal (e.g., the synchronization signal) to be received. The filter 112 may be implemented by a software algorithm, a hardware circuit, or a combination of both.

According to some example embodiments, the device 110 may include a plurality of ADCs 113 and a plurality of filters 112 that are arranged in parallel to correspond to the plurality of antennas 114, respectively.

The synchronization signal detector 111 may perform detection with respect to the received synchronization signal. Detection of the synchronization signal may mean identification of the synchronization signal transmitted from the base station, and also a sequence, a binary code, and/or a cyclic shift that have been used for generation of the synchronization signal.

Figure 2:
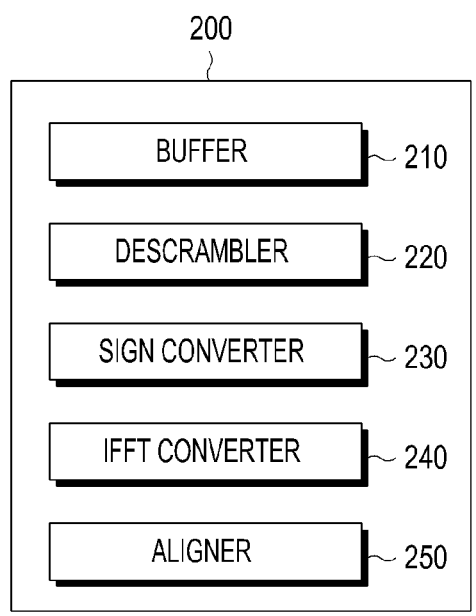
FIG. 2 is a block diagram of a synchronization signal detector according to an example embodiment of the present disclosure.

A detailed description will be made of a structure of the synchronization signal detector with reference to FIG. 2. FIG. 2 is a block diagram of a synchronization signal detector according to an example embodiment of the present disclosure.

Referring to FIG. 2, a synchronization signal detector 200 may include a buffer 210, a descrambler 220, a sign converter 230, an inverse fast Fourier transform (IFFT) converter 240, and an aligner 250.

The buffer 210 may store the received synchronization signal that is input to the synchronization signal detector 200. For example, sampled values of the received synchronization signal may be sequentially stored in the buffer 210.

The descrambler 220 may perform descrambling with respect to the received synchronization signal. The descrambler 220 may descramble the received synchronization signal with respect to all or some of a plurality of possible sequences.

For a sequence of a descrambling result of the descrambler 220, the sign converter 230 may change a sign of members (e.g., symbols) of the sequence or a sign of elements of each member. The change of the sign may be performed based on a set (e.g., the Hadamard matrix) of binary codes, or when descrambling is performed with respect to a sequence having a complex conjugate relationship with a sequence as will be described later.

The IFFT converter 240 may perform an IFFT operation. For example, the IFFT converter 240 may perform an IFFT operation with respect to an output of the sign converter 240 and may obtain a correlation between the received synchronization signal and the sequence, a correlation between the received synchronization signal and the binary code, and/or a correlation between the received synchronization signal and the cyclic shift, through the IFFT operation.

The aligner 250 may align an output of the IFFT converter 240 to detect a sequence, a binary code, and/or a cyclic shift which have the highest correlations with the received synchronization signal.

Figure 3:
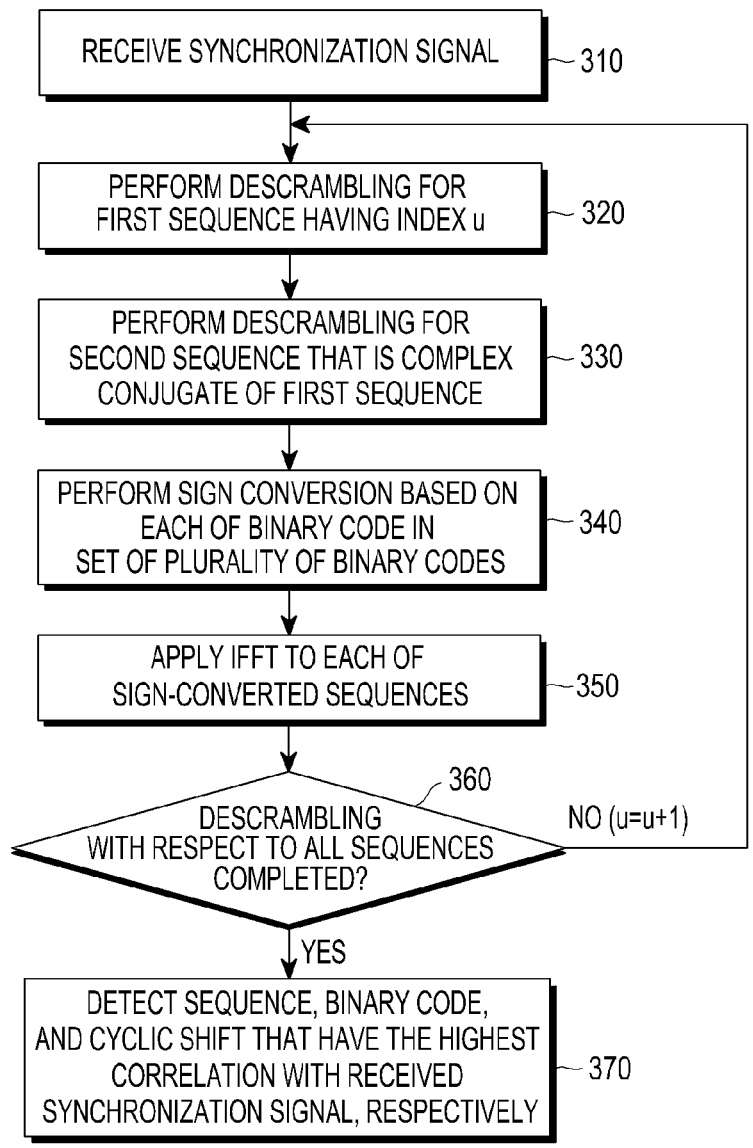
FIG. 3 is a flowchart illustrating a method for detecting a synchronization signal according to an example embodiment of the present disclosure.

A detailed description will be made of an operation of the synchronization signal detector 200 with reference to FIG. 3. FIG. 3 is a flowchart illustrating a method for detecting a synchronization signal according to an example embodiment of the present disclosure.

Referring to FIG. 3, in operation 310, a synchronization signal detector may receive a synchronization signal.

In operation 320, the synchronization signal detector may perform descrambling with respect to a first sequence of an input signal. The first sequence may be one sequence generated by an index u among a plurality of sequences that may be generated by a sequence generator. u may be an integer. At first, u may be set to the smallest value among index values applicable to the sequence generator. For example, if the sequence generator is a ZC sequence generator, the first sequence may be a ZC sequence generated using a root index $r_p$ of u. A ZC sequence $ZC_u(n)$ to which the root index of u is applied may be expressed as below:

$$e^{-\frac{j\pi u(n(n+1))}{N_{ZC}}} = a + jb, \quad (2)$$

where a and b are real numbers. If the received synchronization signal is expressed as Y(n)=c+jd, a descrambled sequence for $ZC_u(n)$ of the input synchronization signal may be expressed as $$Y(n) \cdot e^{\frac{j\pi u(n(n+1))}{N_{ZC}}},$$

where a value of an $n^{th}$ sample (or symbol) equals (ac−bd)+j(ad+bc). Thus, descrambling of a first sequence for the received synchronization signal may be performed by multiplying an equation expressing the received synchronization signal by the first sequence.

In operation 330, the synchronization signal detector may perform descrambling with respect to a second sequence, which is a complex conjugate of the first sequence. As described in relation to operation 320, descrambling of a specific sequence for the received synchronization signal may be performed by multiplying an equation expressing the received synchronization signal by the specific sequence. Because the second sequence is the complex conjugate of the first sequence, a descrambled sequence of the second sequence for the received synchronization signal is a complex conjugate of the descrambled sequence of the first sequence. Thus, the complex conjugate of the descrambled sequence of the second sequence for the received synchronization signal may be deduced by changing a sign of at least one of elements of the descrambled sequence of the first sequence for the received synchronization signal obtained in operation 320, without a direct multiplication operation. For example, a complex conjugate of the ZC sequence having the index u may be a ZC sequence having an index of $N_{ZC}$-u ($N_{ZC}$ is a complex). The ZC sequence having the index of $N_{ZC}$-u may be expressed as below.

$$e^{\frac{j\pi(N_{ZC}-u)(n(n+1))}{N_{ZC}}} = a - jb \quad (3)$$

A descrambled sequence of $ZCN_{ZC}$-u(n) for an input synchronization signal may be expressed as $$Y(n) \cdot e^{\frac{j\pi(N_{ZC}-u)(n(n+1))}{N_{ZC}}},$$

where a value of an $n^{th}$ sample (or symbol) equals (ac+bd)+j(ab−bc). Thus, by merely changing signs of elements 'bd' and 'bc' from the descrambled sequence of $ZC_u(n)$, the descrambled sequence of $ZCN_{ZC}$-u(n) may be obtained.

As stated above, in operation 330, descrambling may be performed with respect to the second sequence merely by changing a sign without substantially preforming a multiplication operation, thereby reducing the number of multiplication operations, which may cause a large overhead during synchronization signal detection. Thus, a processing time and device power consumption for detecting the synchronization signal may be reduced.

According to some example embodiments, descrambling may be performed with respect to the second sequence for the received synchronization signal in the same manner as in operation 320, instead of using complex conjugate characteristics between sequences in operation 330.

According to some example embodiments, operation 330 may be omitted.

In operation 340, the synchronization signal detector may perform sign conversion with respect to each of the descrambled sequence of the first sequence and the descrambled sequence of the second sequence based on each binary code in a set of a plurality of binary codes. For example, in case of NSSS of Equation 1, there may be four rows (e.g., four binary codes) of the Hadamard matrix, and, four sign-converted sequences may be deduced for a descrambled sequence of each sequence. If sign conversion has not been used in synchronization signal generation, operation 340 may be omitted.

In operation 350, the synchronization signal detector may apply IFFT to each of the sign-converted sequences. According to some example embodiments, prior to application of IFFT, symbols of each sign-converted sequence may be sequentially divided in units of N symbols and cumulatively summed, and the IFFT may be applied to the cumulative sum. Herein, N may be an integral multiple of a period of a cyclic shift. For example, for NSSS of Equation 1, the period of the cyclic shift may be four symbols according to q, such that overall four symbols may be a period. Thus, in this case, N may be determined as a natural number multiple of 4 (e.g., 4, 8, 12, . . . ). For example, if N equals 4 and sign-converted sequences are expressed as {S1, S2, S3, S4, S5, S6, S7, S8, S9, S10, S11, S12, . . . }, then symbols of each sign-converted sequence are sequentially divided in units of N symbols and cumulatively summed, and the cumulative sum may be expressed as {S1+S5+S9+ . . . , S2+S6+S10+ . . . , S3+S7+S11+ . . . , S4+S8+S12+ . . . }. Because the cumulative sum is a result of division in units of a natural number multiple of a period of a cyclic shift and cumulative summation, information about the periodicity of the cyclic shift in the cumulative sum may be maintained and a correlation with cyclic shifts may be detected through IFFT. S1, S2, S3, S4,/S5, S6, S7, S8,/S9, S10, S11, S12,/S13 . . . .

For example, N point IFFT may be expressed as follows:

$$x\left[n - m \cdot \left(\frac{N}{L}\right)\right] \leftrightarrow IFFT\left(e^{-\frac{j2\pi mk}{L}} X(k)\right), \quad (4)$$

where k=1, 2, . . . , N, and m=0, 1, . . . , L−1. L indicates a period of a cyclic shift. If IFFT is applied to the sign-converted sample, a phase with respect to phase conversion corresponding to each of applicable cyclic shifts is indicated on an x axis, an absolute value corresponding to phase conversion is indicated on a y axis. The absolute value on the y axis indicates a correlation with the phase. A cyclic shift corresponding to phase conversion having the highest correlation may be determined as the cyclic shift having the highest correlation with the synchronization signal.

In addition, through the IFFT performed in operation 350, a correlation between the received synchronization signal and a sequence applied to each of the sign-converted sequences, a correlation between the received synchronization signal and the binary code, and/or a correlation between the received synchronization signal and the cyclic shift (e.g., the cyclic shift having the highest correlation determined previously) may be detected. As described above, in operation 350, IFFT may be performed with respect to sequences having a short symbol length by dividing and cumulatively summing sign-converted sequences, instead of performing IFFT using all possible cyclic shifts, so as to detect the cyclic shift having the highest correlation. Additional IFFT may be performed once more by using the detected cyclic shift, thereby reducing the number of descrambling operations corresponding to a combination of cyclic shifts. Moreover, the complexity of the N point IFFT is proportional to N (log N). Thus, the IFFT may be performed with respect to divided and cumulatively summed sequences having a short length to reduce N, thereby reducing the complexity of IFFT. Accordingly, a processing time and power consumption for synchronization signal detection may be reduced.

According to some example embodiments, the synchronization signal may be generated without sign conversion using a set of binary codes (e.g., meaning that operation 340 may be omitted). In such example embodiment, operation 350 may be performed with respect to each of the descrambled sequence of the first sequence and the descrambled sequence of the second sequence, instead of the sign-converted sequences.

According to some example embodiments, the synchronization signal may be generated without the cyclic shift (e.g., phase conversion). In this example embodiment, if IFFT is applied to the sign-converted sequence, a detected value may indicate a correlation of the received synchronization signal with a binary code applied to the sign-converted sequence and a correlation between the received synchronization signal and the sequence.

In operation 360, the synchronization signal detector may determine whether descrambling with respect to all sequences is completed. If descrambling with respect to all sequences has not been completed, the index u is increased by 1 and then operation 320 is performed. Once descrambling with respect to all sequences is completed, operation 370 is performed.

In operation 370, the synchronization signal detector may detect a sequence, a binary code, and/or a cyclic shift (or phase conversion), which have the highest correlation with the received synchronization signal. The correlation between the received synchronization signal and the sequence, the correlation between the received synchronization signal and the binary code, and/or the correlation between the received synchronization signal and the cyclic shift (or phase conversion) may be deduced through IFFT in operation 350.

Figure 4:
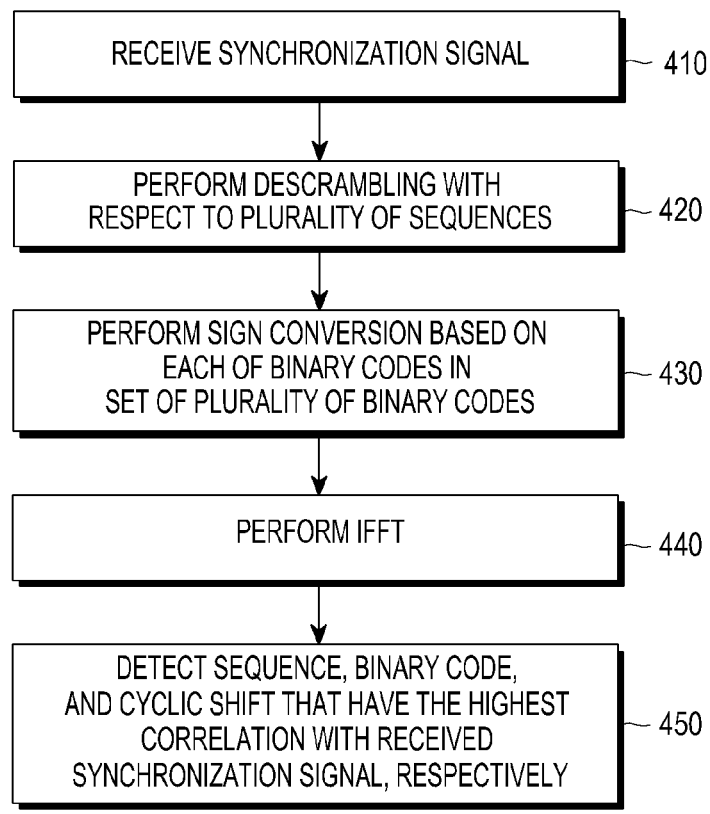
FIG. 4 is a flowchart illustrating a method for detecting a synchronization signal according to another example embodiment of the present disclosure.

A detailed description will be made of a method for detecting a synchronization signal according to another example embodiment with reference to FIG. 4. FIG. 4 is a flowchart illustrating a method for detecting a synchronization signal according to another example embodiment of the present disclosure.

Referring to FIG. 4, in operation 410, a synchronization signal detector may receive a synchronization signal.

In operation 420, the synchronization signal detector may perform descrambling with respect to a plurality of sequences for the received synchronization signal. For example, descrambling with respect to each of a plurality of sequences may be performed to generate a synchronization signal. Descrambling in operation 420 may include descrambling with respect to the first sequence and descrambling with respect to the second sequence, which is the complex conjugate of the first sequence, based on sign conversion with respect to the descrambled sequence of the first sequence, as described in relation to operations 320 and 330 of FIG. 3. According to such example embodiments, the number of multiplication operations during descrambling with respect to sequences having a complex conjugate pair may be reduced.

In operation 430, sign conversion based on each of a plurality of binary codes in a set of the plurality of binary codes may be performed with respect to the descrambled sequence of each of the plurality of sequences of the received synchronization signal obtained in operation 420.

In operation 440, the IFFT may be performed on each of the sign-converted sequences. The IFFT performed in operation 440 may be performed after dividing and cumulatively summing symbols of each sign-converted sequence in the same or substantially similar manner to the IFFT performed in operation 350.

In operation 450, a sequence, a binary code, and/or a cyclic shift (or phase conversion), which have the highest correlation with the received synchronization signal, may be detected. The correlation between the received synchronization signal and the sequence, the correlation between the received synchronization signal and the binary code, and/or the correlation between the received synchronization signal and the cyclic shift (or phase conversion) may be deduced through IFFT in operation 440.

Figure 5:
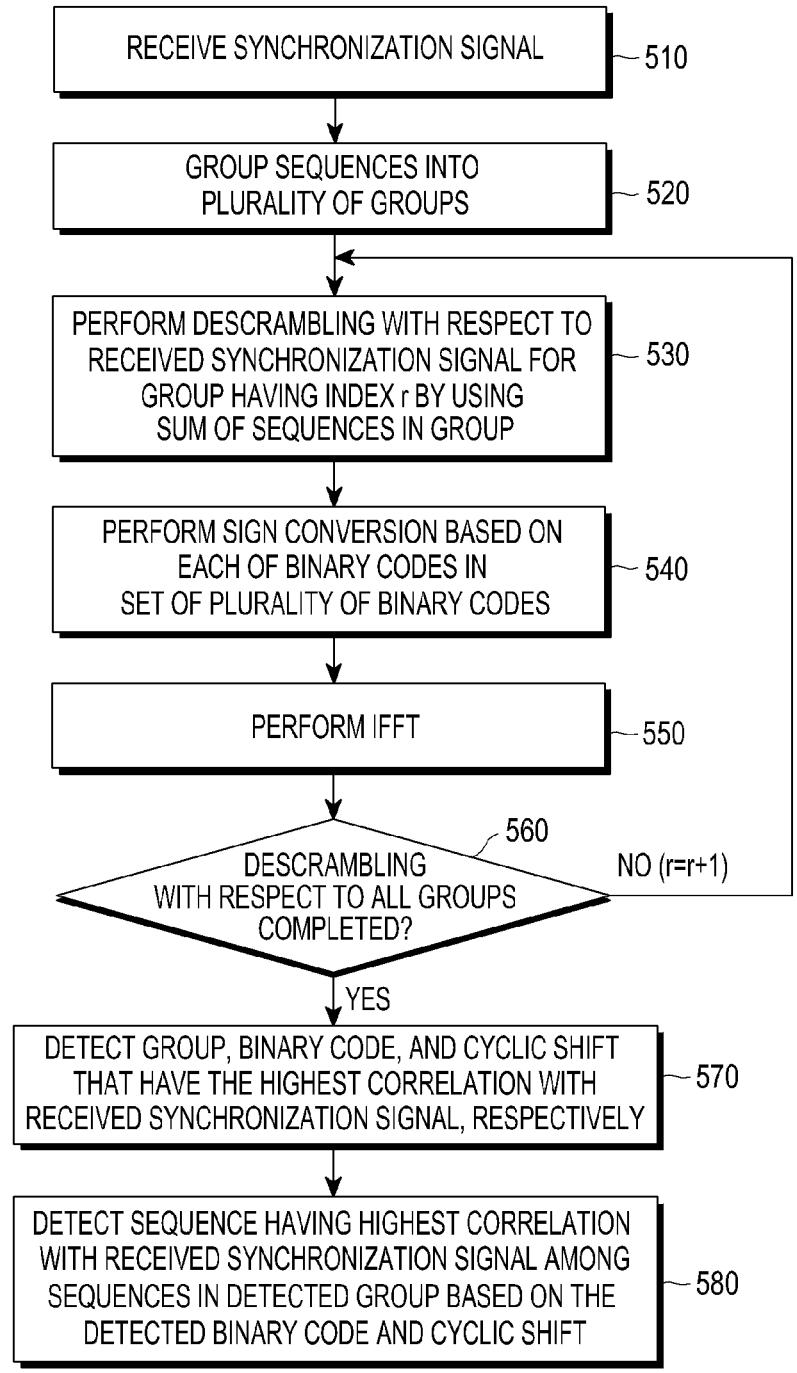
FIG. 5 is a flowchart illustrating a method for detecting a synchronization signal according to another example embodiment of the present disclosure.

A detailed description will be made of a method for detecting a synchronization signal according to another example embodiment with reference to FIG. 5. FIG. 5 is a flowchart illustrating a method for detecting a synchronization signal according to another example embodiment of the present disclosure;

Referring to FIG. 5, in operation 510, a synchronization signal detector may receive a synchronization signal. The synchronization signal may be generated based on one of a plurality of sequences generated by a sequence generator, sign conversion of each element of the sequence using one binary code in a set of a plurality of binary codes, or phase conversion using one of a plurality of phases. According to some example embodiments, sign conversion and/or phase conversion using a binary code may be omitted.

In operation 520, a plurality of sequences for generating the synchronization signal may be grouped into a plurality of groups. Equation 5 provided below expresses a sum $Desc_r$ of sequences in a group having an index r, when a plurality of ZC sequences are grouped into a plurality of groups, each of which is an Ng ZC sequence.

$$Desc_r = \left\{ e^{\frac{j\pi u'(n(n+1))}{N_{ZC}}} + e^{\frac{j\pi(u'+1)(n(n+1))}{N_{ZC}}} + \ldots + e^{\frac{j\pi(u'+(Ng-1))(n(n+1))}{N_{ZC}}} \middle| n = 0, \ldots, 131 \right\}, \quad (5)$$

where a root index u=3, 4, ..., 128 for a ZC sequence, u'=r×Ng+3, and r=0, 1, ..., 126/Ng.

In Equation 5, ZC sequences having sequential root index values may be grouped into one group, but a method for forming a plurality of groups is not necessarily limited to Equation 5. According to some example embodiments, at least one of a plurality of groups may include a pair of sequences that are complex conjugates.

As the number of sequences included in each group, e.g., Ng, increases, the complexity of an operation during synchronization signal detection may decrease, thereby compromising SNR characteristics of the received synchronization signal. Thus, the number of sequences included in each group may be selected properly considering the quality of a received signal according to an application field of the device. According to some example embodiments, the number of sequences included in each group may increase based on improvement of a signal quality (e.g., an SNR) of a received synchronization signal; the number of sequences included in each group may decrease based on deterioration of the signal quality (e.g., the SNR) of the received synchronization signal.

In operation 530, the synchronization signal detector may perform descrambling with respect to the received synchronization signal by using a sum of sequences in a group having an index r among the plurality of groups of the plurality of sequences, generated in operation 520. For example, the synchronization signal detector may generate a new reference signal by summing the sequences in the group having the index r, and descramble the new reference signal with the received synchronization signal.

If operation 530 is performed first, the index r for the group may be set to a possible minimum value.

In operation 540, the synchronization signal detector may perform sign conversion based on each of a plurality of binary codes in a set of the plurality of binary codes with respect to the descrambled sequences for the group of the received synchronization signal obtained in operation 530. If the synchronization signal has been generated without using sign conversion based on the binary code, operation 540 may be omitted.

In operation 550, the synchronization signal detector may apply IFFT to each of the sign-converted sequences deduced in operation 540. In operation 550, the IFFT may be applied to all the sign-converted sequences without dividing and cumulatively summing symbols of the sign-converted sequences. In operation 550, through the IFFT, a correlation of the received synchronization signal with the group having the index r, a correlation between the received synchronization signal and each binary code, and/or a correlation between the received synchronization signal and each cyclic shift (phase conversion) may be deduced. According to some example embodiments, if the synchronization signal has been generated without using binary-code-based sign conversion, then the correlation of the received synchronization signal with each binary code may not be deduced in operation 550. According to some example embodiments, if the synchronization signal has been generated without using phase conversion based on one of a plurality of phases, then the correlation of the received synchronization signal with each phase may not be deduced in operation 550.

In operation 560, the synchronization signal detector may determine whether descrambling with respect to all sequences is completed. If descrambling with respect to all sequences has not been completed, the index r is increased by 1 and then operation 530 is performed. Once descrambling with respect to all sequences is completed, operation 570 is performed.

In operation 570, the synchronization signal detector may detect a group having the highest correlation with the received synchronization signal among the plurality of groups, a binary code having the highest correlation with the received synchronization signal among the plurality of binary codes, and/or a cyclic shift (e.g., a phase) having the highest correlation with the received synchronization signal among the plurality of cyclic shifts (e.g., phases), based on the correlation between the received synchronization signal and each group, the correlation between the received synchronization signal and each binary code, and/or the correlation between the received synchronization signal and each cyclic shift (phase conversion) obtained in operation 550. According to some example embodiments, if the synchronization signal has been generated without using binary-code-based sign conversion, then the binary code having the highest correlation with the received synchronization signal may not be detected in operation 570. According to some example embodiments, if the synchronization signal has been generated without using phase conversion based on one of the plurality of phases, then the phase having the highest correlation with the received synchronization signal may not be detected in operation 570.

In operation 580, the synchronization signal detector may detect a sequence having the highest correlation with the received synchronization signal among sequences in the group having the highest correlation with the received synchronization signal, based on the binary code having the highest correlation detected in operation 570. The detection in operation 580 may be performed by descrambling the received synchronization signal by using each of the sequences in the group having the highest correlation with the received synchronization signal, the binary code having the highest correlation with the received synchronization signal, and/or phase conversion based on the phase having the highest correlation with the received synchronization signal. According to some example embodiments, if the synchronization signal has been generated without using binary-code-based sign conversion, then the detection in operation 580 may be performed without using the binary code having the highest correlation with the received synchronization signal. According to several example embodiments, if the synchronization signal has been generated without using phase conversion based on one of the plurality of phases, then the detection in operation 580 may be performed without using phase conversion based on the phase having the highest correlation with the received synchronization signal.

According to the example embodiment illustrated in FIG. 5, by performing descrambling based on grouping of sequences in comparison to descrambling based on possible combinations of a plurality of sequences, a plurality of binary codes, and a plurality of cyclic shifts (or phase conversion), the complexity of an operation may be reduced, and thus a processing time and power consumption may be reduced.

According to some example embodiments, operation 540 may be omitted, and in this example embodiment, the IFFT in operation 550 may be performed with respect to outputs of operation 530, and other operations may be performed excluding matters related to a binary code.

Figure 6:
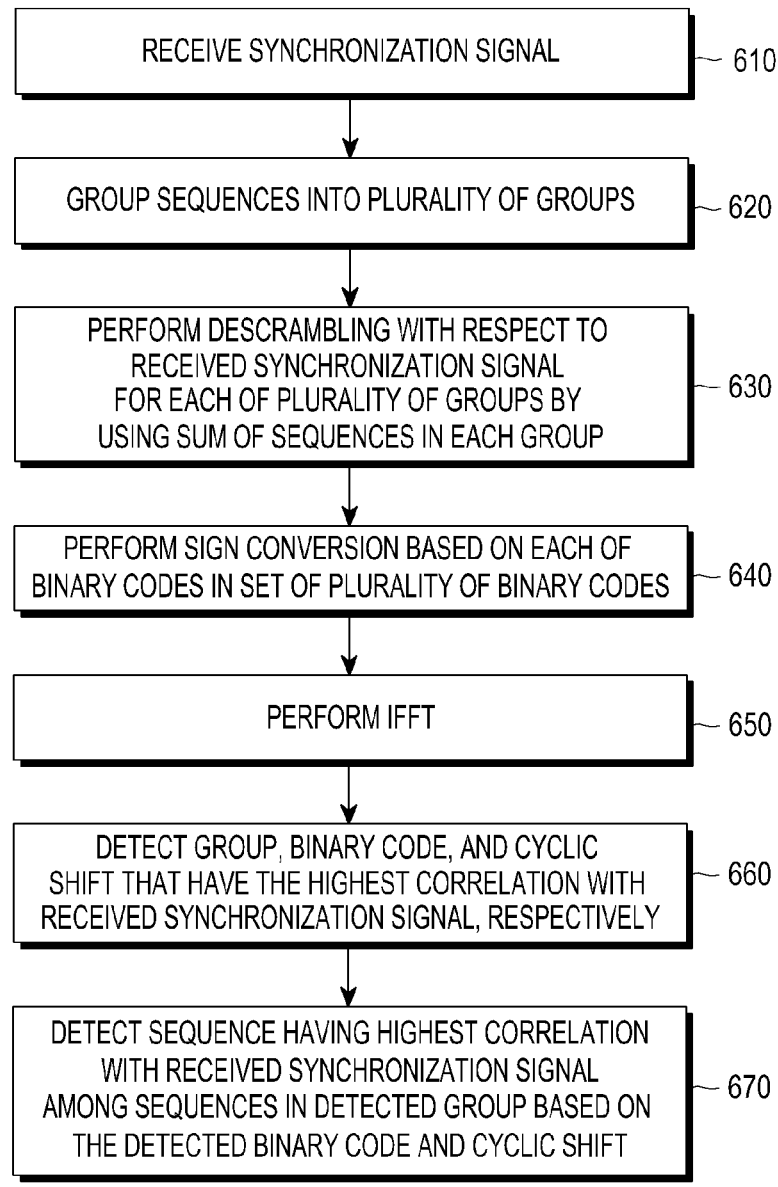
FIG. 6 is a flowchart illustrating a method for detecting a synchronization signal according to another example embodiment of the present disclosure.

A detailed description will be made of a method for detecting a synchronization signal according to another example embodiment with reference to FIG. 6. FIG. 6 is a flowchart illustrating a method for detecting a synchronization signal according to another example embodiment of the present disclosure.

Referring to FIG. 6, in operation 610, a synchronization signal detector may receive a synchronization signal. The synchronization signal may be generated based on one of a plurality of sequences generated by a sequence generator, sign conversion of each element of the sequence using one binary code in a set of a plurality of binary codes, or phase conversion using one of a plurality of phases. According to some example embodiments, sign conversion and/or phase conversion using a binary code may be omitted.

In operation 620, the synchronization signal detector may group a plurality of sequences into a plurality of groups. A description of operation 620 may be the same or substantially similar to the description of operation 520.

In operation 630, the synchronization signal detector may descramble the received synchronization signal for each of a plurality of groups for a reference signal, which is generated based on a sum of sequences in each of the plurality of groups.

In operation 640, the synchronization signal detector may perform sign conversion based on each binary code with respect to the descrambled sequences generated in operation 630 for each group of the received synchronization signal.

In operation 650, the synchronization signal detector may apply IFFT to each of the sign-converted sequences deduced in operation 640. In operation 650, the IFFT may be applied to all the sign-converted sequences without dividing and cumulatively summing symbols of the sign-converted sequences. In operation 650, through the IFFT, a correlation between the received synchronization signal and each of the plurality of groups, a correlation between the received synchronization signal and each binary code, and/or a correlation between the received synchronization signal and each cyclic shift (phase conversion) may be deduced.

In operation 660, the synchronization signal detector may detect a group having the highest correlation with the received synchronization signal among the plurality of groups, a binary code having the highest correlation with the received synchronization signal among the plurality of binary codes, and/or a cyclic shift having the highest correlation with the received synchronization signal among the plurality of cyclic shifts (e.g., phases), based on the correlation between the received synchronization signal and each group, the correlation between the received synchronization signal and each binary code, and/or the correlation between the received synchronization signal and each cyclic shift (phase conversion) obtained in operation 650.

In operation 670, the synchronization signal detector may detect a sequence having the highest correlation with the received synchronization signal among sequences in the group having the highest correlation with the received synchronization signal, based on the binary code having the highest correlation detected in operation 660. The detection in operation 670 may be performed by descrambling the received synchronization signal by using each of the sequences in the group having the highest correlation with the received synchronization signal, the binary code having the highest correlation with the received synchronization signal, and/or phase conversion based on the phase having the highest correlation with the received synchronization signal.

According to some example embodiments, operation 640 may be omitted, as described with regard to operation 540 above.

Figure 7:
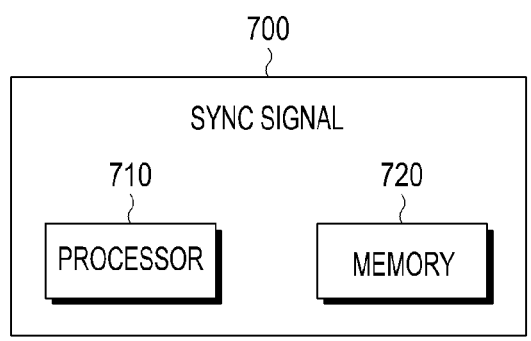
FIG. 7 is a block diagram of a chipset for detecting a synchronization signal according to an example embodiment of the present disclosure.

According to some example embodiments, the synchronization signal detector may be implemented with a chip or a chipset. With reference to FIG. 7, a description will be made of a chip or a chipset for detecting a synchronization signal according to another example embodiment of the present disclosure. FIG. 7 is a block diagram of a chipset (or a chip) for detecting a synchronization signal according to an example embodiment of the present disclosure.

Referring to FIG. 7, a chipset 700 for detecting a synchronization signal may include a processor 710 and a memory 720. The processor 710 may be configured to perform operations described above with reference to FIGS. 3 through 6. The memory 720 may store transient information and/or non-transient information, needed for the processor 710 to perform the operations. The transient information may include data needed or deduced in an operation of the processor 710. The non-transient information may include computer program codes or instructions for driving the processor 710. According to some example embodiments, the chipset 700 may not include the memory 720 and the memory 720 may be implemented outside the chipset 700.

According to some embodiments of the present disclosure, at least effects described below may be obtained.

That is, a processing time for detecting the synchronization signal may be reduced.

Moreover, power consumption needed for synchronization signal detection may be reduced.

The effects according to the present disclosure are not limited to the illustrated and described matters, and there may be other various effects.

While some example embodiments of the present disclosure have been described with reference to the attached drawings, those of ordinary skill in the art to which the present disclosure pertains will appreciate that the present disclosure may be implemented in different detailed ways without departing from the technical spirit or essential characteristics of the present disclosure. Accordingly, the aforementioned example embodiments should be construed as being only illustrative, but should not be constructed as being restrictive from all aspects.

What is claimed is:

1. A chip for detecting a synchronization signal generated based on one of a plurality of sequences, which is generated by a sequence generator, the chip comprising:
 a memory; and
 a processor connected to the memory, the processor configured to,
 receive the synchronization signal transmitted from a device,
 perform first descrambling of the received synchronization signal with respect to a first sequence from among the plurality of sequences by multiplying the received synchronization signal by the first sequence to generate a first descrambled sequence of the first sequence,
 perform second descrambling of the received synchronization signal with respect to a second sequence, which is a complex conjugate of the first sequence, from among the plurality of sequences of the received synchronization signal and deduce a second descrambled sequence of the second sequence by (1) changing a sign of at least one element of the first descrambled sequence of the first sequence and (2) not performing any multiplication operations,
 in response to the synchronization signal being generated further based on one binary code in a set of a plurality of binary codes for determining a sign of one of the plurality of sequences, generate a plurality of sign-converted sequences with respect to the plurality of sequences by changing a sign of elements of the first descrambled sequence of the first descrambling and the second descrambled sequence of the second descrambling for each of the plurality of sequences based on each of the plurality of binary codes for determining a sign of the one of the plurality of sequences,
 apply inverse-fast-fourier-transform (IFFT) with respect to each of the plurality of sign-converted sequences,
 detect at least one of a specific sequence, a binary code, or a cyclic shift that have a greatest correlation with the received synchronization signal based on a result of applying the IFFT after completing the first descrambling and the second descrambling with respect to all sequences of the plurality of sequences, and
 identify the synchronization signal based on at least one of the detected specific sequence, the detected binary code, or the detected cyclic shift.

2. The chip of claim 1, wherein the sequence generator is a Zadoff Chu (ZC) sequence generator, which is configured to generate a difference sequence based on a root index, the root index of the first sequence is u, the root index of the second sequence is Nzc-u, and Nzc is a decimal.

3. The chip of claim 1, wherein in response to the first sequence being a+jb and the received synchronization signal being c+dj, the processor is configured to perform the second descrambling with respect to the second sequence by changing signs of two elements of a product (ac−bd)+j(ad+be) of the first sequence and the received synchronization signal to generate (ac+bd)+j(ad−bc) as the second descrambled sequence of the second sequence, where a, b, c, and d are real numbers, respectively.

4. The chip of claim 1, wherein the set of the plurality of binary codes is a Hadamard matrix, and a number of the plurality of binary codes is 4.

5. The chip of claim 1, wherein in response to the synchronization signal being generated further based on phase conversion using one of a plurality of phases, the processor is further configured to,
- apply inverse fast fourier transform (IFFT) to a cumulative sum of results, the cumulative sum of results obtained by sequentially dividing symbols of each of the plurality of sign-converted sequences in units of N samples, N being a number of the plurality of binary codes corresponding to each of the plurality of sequences, and cumulatively summing the symbols in each of the units of N samples, and
- detect a phase having a greatest correlation with the received synchronization signal from among the plurality of phases based on a result of the applying IFFT to a cumulative sum of results.

6. The chip of claim 5, wherein N is a natural number, which is a multiple of a number of the plurality of phases.

7. The chip of claim 5, wherein the processor is further configured to deduce, from the result of the applying IFFT to a cumulative sum of results, a first correlation between the received synchronization signal and each of the plurality of sequences and a second correlation between the received synchronization signal and each of the plurality of binary codes.

8. A chip for detecting a synchronization signal generated based on one of a plurality of sequences, which is generated by a sequence generator and based on one of a plurality of phases, the chip comprising:
- a memory; and
- a processor connected to the memory, the processor configured to,
- receive the synchronization signal transmitted from a device,
- perform first descrambling of the received synchronization signal with respect to a first sequence from among the plurality of sequences by multiplying the received synchronization signal by the first sequence to generate a first descrambled sequence of the first sequence,
- perform second descrambling of the received synchronization signal with respect to a second sequence, which is a complex conjugate of the first sequence, from among the plurality of sequences of the received synchronization signal and deduce a second descrambled sequence of the second sequence by (1) changing a sign of at least one element of the first descrambled sequence of the first sequence and (2) not performing any multiplication operations,
- when the synchronization signal is generated further based on one binary code in a set of a plurality of binary codes for determining a sign of symbols of one of the plurality of sequences, generate a plurality of sign-converted sequences by performing sign conversion with respect to the first descrambled sequence of the first sequence and the second descrambled sequence of the second sequence based on each of the plurality of binary codes for determining a sign of symbols of the one of the plurality of sequences,
- apply inverse fast fourier transform (IFFT) to a cumulative sum of results, the cumulative sum of results obtained by sequentially dividing symbols of each of the plurality of sign-converted sequences in units of N samples and cumulatively summing the symbols in each of the units of N samples,
- detect a phase having the greatest correlation with the received synchronization signal from among the plurality of phases based on a result of applying the IFFT after completing the first descrambling and the second descrambling with respect to all sequences of the plurality of sequences, and
- identify the synchronization signal based on the detected phase.

9. The chip of claim 8, wherein N is a natural number, which is a multiple of a number of the plurality of phases.

10. The chip of claim 8, wherein the set of the plurality of binary codes is a Hadamard matrix, and a number of the plurality of binary codes is 4.

11. The chip of claim 8, wherein the processor is further configured to deduce, from the result of applying the IFFT, a first correlation between the received synchronization signal and each of the plurality of sequences and a second correlation between the received synchronization signal and each of the plurality of binary codes.

12. A method for identifying a device transmitting a synchronization signal, which is generated based on one of a plurality of sequences, the method comprising:
- receiving an analog signal including the synchronization signal transmitted from the device;
- sampling the analog signal into a digital signal;
- filtering out a portion of the digital signal, which has a frequency band different from that of the synchronization signal, from the digital signal to produce a filtered digital signal;
- performing first descrambling of the filtered digital signal with respect to a first sequence from among the plurality of sequences by multiplying the filtered digital signal by the first sequence to generate a first descrambled sequence of the first sequence; performing second descrambling of the filtered digital signal with respect to a second sequence, which is a complex conjugate of the first sequence, from among the plurality of sequences of the filtered digital signal and deducing a second descrambled sequence of the second sequence by (1) changing a sign of at least one element of the first descrambled sequence of the first sequence and (2) not performing any multiplication operations;
- in response to the synchronization signal generated further based on one binary code in a set of a plurality of binary codes for determining a sign of the one of the plurality of sequences, generating a plurality of sign-converted sequences with respect to the plurality of sequences by changing a sign of elements of the first descrambled sequence of the first descrambling and the second descrambled sequence of the second descrambling for each of the plurality of sequences based on each of the plurality of binary codes for determining the sign of the one of the plurality of sequences;
- applying inverse-fast-fourier-transform (IFFT) with respect to each of the plurality of sign-converted sequences;
- detecting at least one of a specific sequence, a binary code, or a cyclic shift that have a greatest correlation with the received synchronization signal based on a result of applying the IFFT after completing the first descrambling and the second descrambling with respect to all sequences of the plurality of sequences; and
- identifying the device having transmitted the synchronization signal based on at least one of the detected specific sequence, the detected binary code, or the detected cyclic shift.

13. The method of claim 12, wherein the synchronization signal is a signal in which a Zadoff Chu (ZC) sequence, a Hadamard matrix, and the cyclic shift are combined.

14. The method of claim 12, wherein in response to the first sequence being a+jb and the filtered digital signal being c+dj, the performing second descrambling generates (ac+bd)+j(ad−bc) as the second descrambled sequence of the second sequence includes by changing signs of two elements of a product (ac−bd)+j(ad+be) of the first sequence and the filtered digital signal, where a, b, c, and d are real numbers, respectively.

15. The method of claim 12, further comprising:
in response to the synchronization signal generated further based on phase conversion using one of a plurality of phases,
applying inverse fast fourier transform (IFFT) to a cumulative sum of results, the cumulative sum of results obtained by sequentially dividing the plurality of sign-converted sequences in units of N samples, N being a number of the plurality of binary codes corresponding to each of the plurality of sequences, and
detecting a phase having a greatest correlation with the filtered digital signal from among the plurality of phases based on a result of the applying IFFT.

16. The method of claim 15, further comprising:
deducing, from the result of the applying IFFT, a first correlation between the filtered digital signal and each of the plurality of sequences and a second correlation between the filtered digital signal and each of the plurality of binary codes.

17. The method of claim 12, further comprising:
applying inverse fast fourier transform (IFFT) with respect to sequences having a reduced symbol length by dividing and cumulatively summing sign-converted sequences of the first descrambled sequence of the first sequence and the second descrambled sequence of the second sequence instead of performing the IFFT using all possible cyclic shifts.

* * * * *